No. 743,645. PATENTED NOV. 10, 1903.
O. KELSEY.
PISTON.
APPLICATION FILED MAR. 3, 1903.
NO MODEL.
2 SHEETS—SHEET 2.

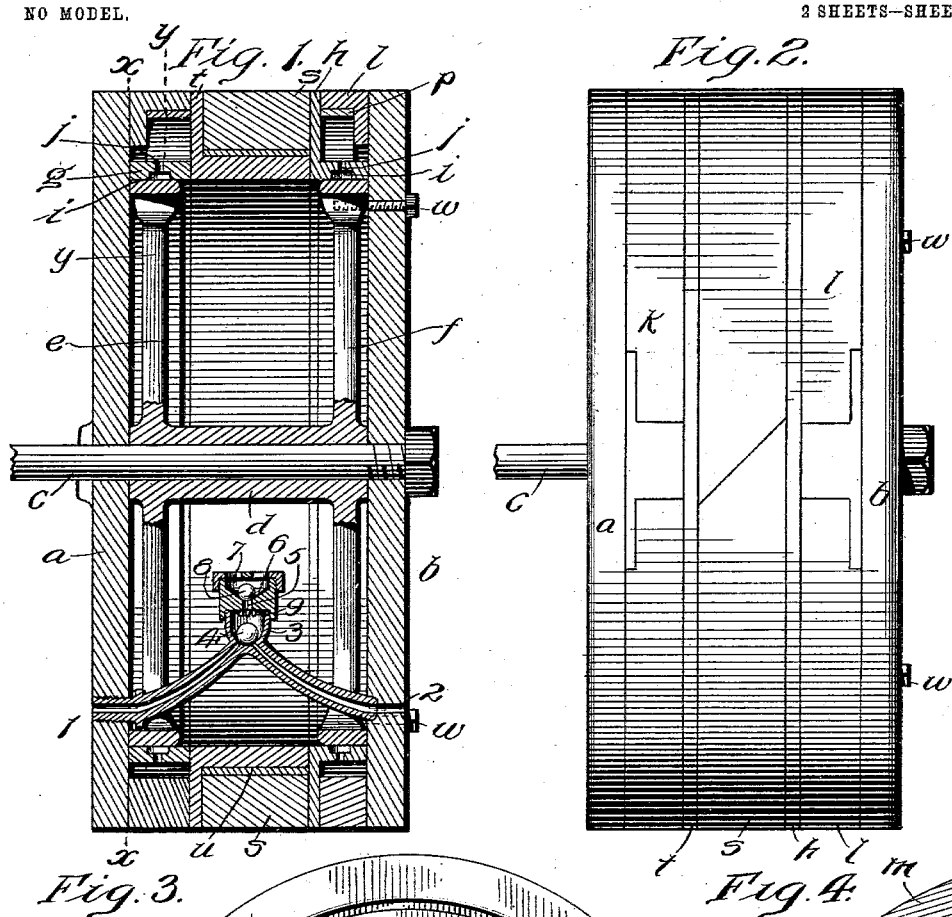

WITNESSES:
F. J. Hartman
Benj. W. Wilson

INVENTOR
Orlando Kelsey
BY
Chas. A. Cutter
ATTORNEY.

No. 743,645. Patented November 10, 1903.

UNITED STATES PATENT OFFICE.

ORLANDO KELSEY, OF BLACKWOOD, NEW JERSEY.

PISTON.

SPECIFICATION forming part of Letters Patent No. 743,645, dated November 10, 1903.

Application filed March 3, 1903. Serial No. 145,945. (No model.)

*To all whom it may concern:*

Be it known that I, ORLANDO KELSEY, a citizen of the United States, and a resident of Blackwood, Camden county, New Jersey, have invented certain new and useful Improvements in Pistons, of which the following is a specification.

My invention relates to improvements in pistons for steam-engines, and more particularly to improvements in that type of piston which is furnished with a hollow interior into which steam is admitted to force the packing-rings outward against the cylinder.

My invention consists principally in improvements in the forms of the packing and bearing rings, in the means for carrying these rings, and in the valves for controlling the admission of steam to the interior of the piston.

Figure 5:
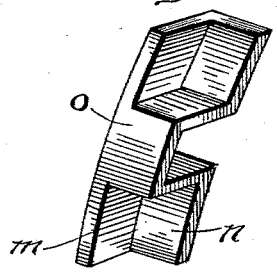
Figure 6:
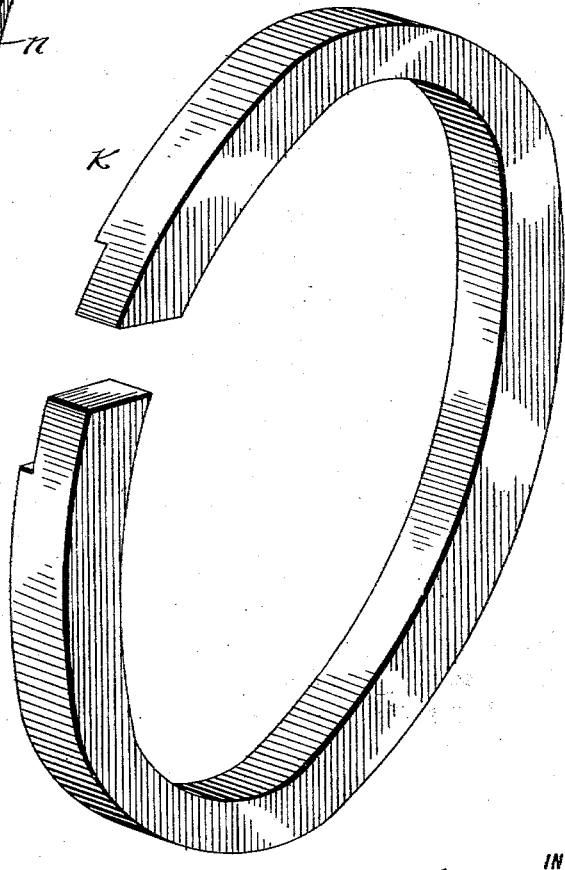

In the accompanying drawings, forming part of this specification, and in which similar characters of reference indicate similar parts throughout the several views, Figure 1 is a central sectional elevation of a piston embodying my improvements; Fig. 2, a side elevation of the piston; Fig. 3, a section of Fig. 1 on line X X; Fig. 4, a section of Fig. 1 on line Y Y; Fig. 5, a perspective view of the packing-piece for closing the ends of the packing-rings; Fig. 6, a perspective view of one of the packing-rings.

$a\ b$ are the heads of the piston; $c$, the piston-rod; $d$, a hub or hubs carried by shaft $c$, which carry arms $e\ f$, which form spiders which carry, respectively, the rings $g\ h$, the former of which is a simple annular ring and the latter of which has an L-shaped cross-section.

The ring $g$ and the base of the ring $h$ are both furnished with annular grooves $i$, with which communicate perforations $j$. (Best shown in Figs. 1 and 4.)

$k\ l$ are the packing-rings, which are circular in form, both of which have preferably a rectangular cross-section, as best shown in Fig. 6. These rings are split, so that steam being admitted to these inner sides they will expand and bear tightly against the inside of the cylinder, thus not only making a tight joint, but compensating for any wear that may occur.

The ends of each of the rings $k\ l$ are separated, and between them is placed a metallic packing-piece $r$. (Best shown in Figs. 4 and 5.) This packing-piece is furnished with a side $m$ with a base or flange $n$, upon which the ends of the rings rest, and with an upwardly-projecting stop $o$, against which the ends of the rings bear.

A spring $p$, Figs. 1 and 4, bearing against the outer peripheries of rings $g\ h$, holds the packing-piece in place.

From Figs. 2 and 6 it will be seen that the outer sides of packing-rings $k\ l$ are cut away to receive the sides $m$ of the packing-piece $r$.

The bearing-ring $s$ is split, as shown in Fig. 2. It is carried upon an L-shaped ring $t$, Fig. 1, and can be expanded as it wears down by using thicker carrying-pieces $u$, which are interposed between the bearing-ring $s$ and its carrying-ring $t$.

$w$ represents bolts or studs passing through head $b$ and into spider-arms $f$, which hold the several parts of the piston together.

When it becomes necessary to take the piston apart, the head $b$ is removed, then the packing-ring $l$, next the ring $h$, then the bearing-ring $s$, then the carrying-ring $t$, and, finally, the carrying-ring $g$ and packing-ring $k$. Steam is admitted into the interior of the piston on one stroke through pipe 1 and upon the other stroke through pipe 2, Figs. 1 and 3. The outer ends of pipes 1 and 2, or holes communicating with these pipes, pass through the piston-heads $a\ b$, while their inner ends communicate with a chamber 3, which carries a ball 4, which when seated closes the inner ends of both pipes. The top of chamber 3 communicates through an opening 5 with an upper chamber 6, which has a perforated top 7 and which carries a ball 8. The ball 8 when seated against the opening 5 closes off this opening against any outward rush of steam. The lower side of opening 5 is furnished with fingers 9, Fig. 1, to prevent the ball 4 from rising and closing opening 5.

The operation of the above-described compound valve is as follows: One of the pipes 1 2 is always open to the steam side of the piston, the other to the exhaust side. From the steam side steam passes through one of the pipes 1 2 to chamber 3, through opening 5, to chamber 6, to the interior of the piston, whence it passes through openings $j$ to the under side of packing-rings $k\ l$, forcing these rings tightly against the cylinder. Steam is prevented from escaping from the interior of piston to the exhaust by the ball 8 closing the opening 5, as well as the ball 4 closing the inner ends of pipes 1 2. As soon, however, as the balance of pressure between the interior of the piston and the steam end of the cylinder is broken—that is, as soon as the pressure within the piston becomes less than the pressure within the cylinder—the balls 4 8 are lifted and steam is admitted to the interior of the piston until the balance is again established.

Having thus described my invention, I claim as new and desire to secure by Letters Patent—

1. In a piston, in combination, heads, two split annular packing-rings, perforated annular carrying-rings within said packing-rings, the outer peripheries of said carrying-rings being of less diameter than the inner diameter of said packing-rings so as to form a steam-space between them, a split guiding-ring interposed between said packing-rings, a carrying-ring for carrying said guiding-ring, means interposed between said guiding and carrying rings for expanding the former, a spider for carrying said carrying-rings, and means for introducing steam to the interior of said piston.

2. In a piston, in combination, heads, two split annular packing-rings, perforated annular carrying-rings within said packing-rings, a split guiding-ring interposed between said packing-rings, means for carrying said rings, means for expanding said rings, a compound valve consisting of an upper and a lower chamber communicating with each other and each carrying a ball, a perforated top covering the upper chamber, and ducts leading from the lower chamber one to one face of the piston and the other to the other face of the piston.

3. The combination in a piston, of a perforated carrying-ring, a split packing-ring of greater diameter than and surrounding said carrying-ring, a packing-piece having a flange adapted to rest against the inner periphery of the packing-ring and an upwardly-projecting stop adapted to close the gap between the ends of the packing-ring, and a spring bearing against the outer side of the carrying-ring and against the under side of the packing-piece.

4. In a piston, in combination, heads, two split annular packing-rings, perforated carrying-rings within said packing-rings, a split guiding-ring interposed between said packing-rings, a carrying-ring for carrying said guiding-rings, means for carrying said carrying-rings, means for expanding said rings, a compound valve consisting of an upper and a lower chamber the latter of which communicates with the former and the former with the interior of the piston and each of which carries a ball, and ducts communicating one with one side of the piston and the other with the other side of the piston and both with the interior of the lower chamber.

5. The combination in a piston, of heads, a carrying-ring of substantially rectangular cross-section, a perforated packing-ring surrounding but not touching said carrying-ring of substantially L-shaped cross-section, a split guiding-ring surrounding said carrying-ring, means interposed between said guiding and carrying rings for carrying the latter, a carrying-ring of substantially L-shaped cross-section, a split packing-ring carried by said carrying-ring, means for carrying said several rings and means for introducing and for maintaining steam at a substantially uniform pressure within said piston.

ORLANDO KELSEY.

Witnesses:
GEO. H. HILL, Jr.,
CHAS. A. RUTTER.